Patented Aug. 19, 1952

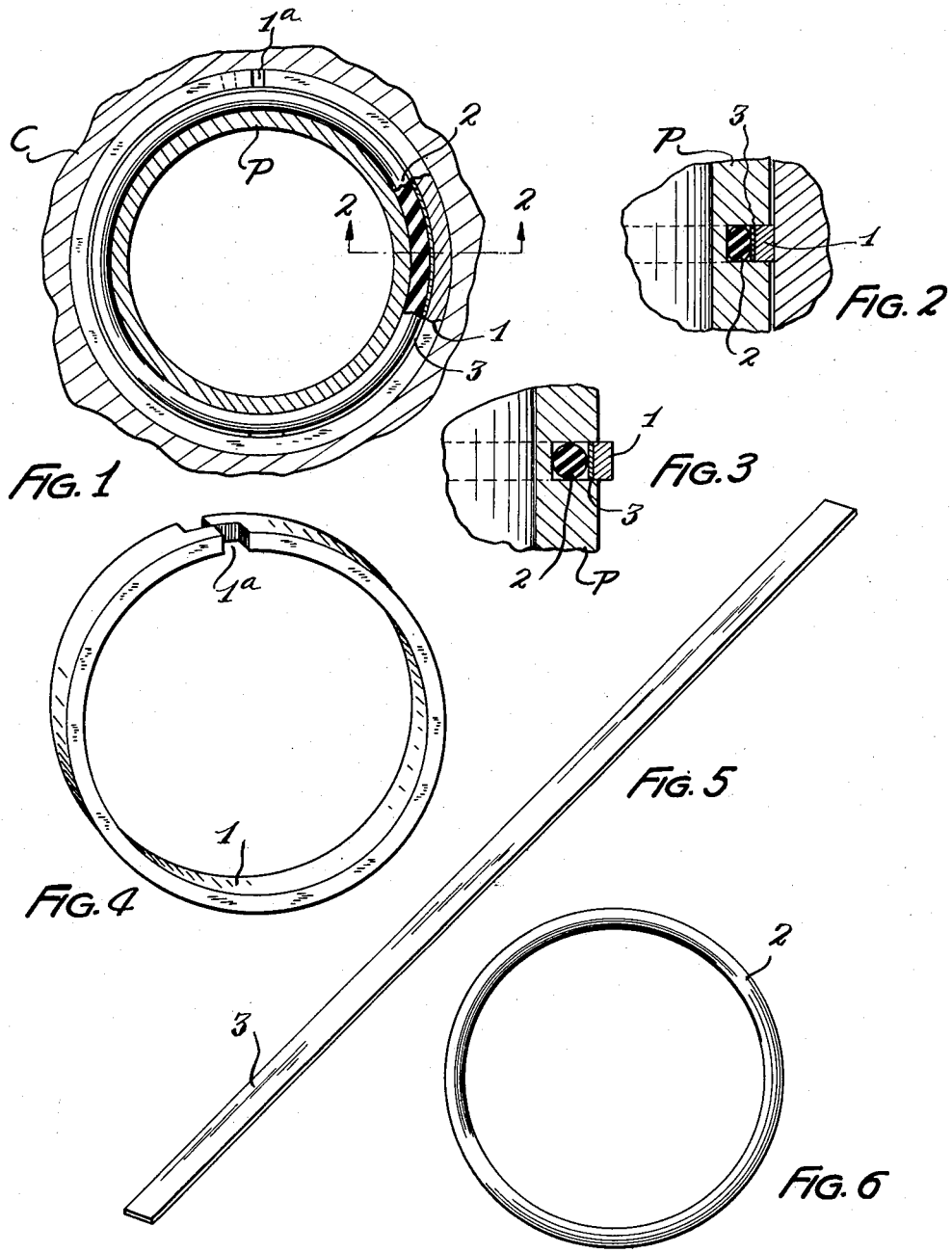

2,607,644

UNITED STATES PATENT OFFICE 2,607,644

SEALING MEANS

Rolland D. Smith, Euclid, and George T. Turner, Cleveland, Ohio, assignors to The Auto-Diesel Piston Ring Company, Cleveland, Ohio, a corporation of Ohio Application October 14, 1949, Serial No. 121,412

2 Claims. (Cl. 309—43)

This invention relates to the art of sealing means for rotating or reciprocating parts in various engine and machine assemblies, as for instance reciprocating pistons and the like.

The one-piece split metallic piston ring with a stepped joint between its ends, is of course old and well known. In our past attempts to combine with this old form of ring, a rubber ring upon the inside thereof for the purpose of improving the seal, we have found that there is danger of the rubber being seriously damaged between the joint ends of the metallic split ring, with the result that the dependability and useful life of the rubber ring are greatly reduced.

Therefore it is the object of our present invention to devise a sealing means comprising a split metallic ring member and a rubber sealing ring member upon the inside thereof, with means for protecting the rubber ring in the region of the joint of the outer metallic split ring member.

More specifically, our present invention comprises a multiple-part sealing means including an outer split metallic ring member with a joint for closing the ends thereof, a resilient compressible rubber sealing ring member inside the first ring member, and an intermediate resilient strip form of member that will serve to protect the rubber ring from any damage by the joint ends of the metallic split ring member.

Other objects will appear from the following description and claims when considered together with the accompanying drawing.

Fig. 1 is a transverse sectional view of an installation of our present invention in a piston and cylinder assembly;

Fig. 2 is a view taken on line 2—2 of Fig. 1;

Fig. 3 is a sectional view illustrating the installation of our present invention in a piston prior to the assembly of the piston within its cylinder;

Fig. 4 is a perspective view of the outer metallic split ring member which forms part of our present assembly;

Fig. 5 is a perspective view of the intermediate spring strip member which is intended to be arranged between the inner and outer members of the assembly; and Fig. 6 illustrates the inner rubber ring member.

It is to be understood that the present form of disclosure is merely for the purpose of illustration and that there might be devised various modifications thereof without departing from the spirit of our invention as herein set forth and claimed.

Our present form of sealing means is intended to be applied in the same usual manner as the conventional one-piece ring, and without involving any change in the parts of the engine or machine to which applied. For instance, a sealing ring embodying our present invention may be applied to the conventional piston groove of an internal combustion engine. Accordingly the several parts of our present sealing means will be made of suitable proportions so that their combined radial and lateral dimensions may be accommodated by the usual depth of groove intended for the conventional form of piston ring.

Referring to the accompanying drawing in detail, our present form of device comprises the split metallic ring member 1 with its stepped joint 1a, which may be of conventional form, the closed rubber ring member 2 and the intermediate spring metal strip 3.

The outer surface of the split ring member 1 is adapted for reciprocatory engagement with the inner wall of the piston cylinder C, for instance, and this ring will of course possess a certain resilience for radial expansion against the cylinder wall, as will be understood. The ring member 1 will also fit within the groove of the piston P but with sufficient clearance to permit the resilient engagement of the ring member 1 with the wall of the cylinder in the required manner.

The one-piece rubber ring member 2 may be of any suitable form and is here shown as being of closed form and of circular cross section when in idle position, as indicated in the drawing. The cross section of this rubber ring is approximately the same as the width of the metal ring 1, as indicated in Fig. 3 of the drawing, and this rubber ring is intended to be installed within the metal ring 1 so as to increase the sealing effect and to increase the radial resilience of the complete ring assembly.

Between the metal ring member 1 and the rubber ring member 2 we have provided the strip 3 of spring metal which is intended primarily to prevent the joint ends of the metal ring 1 from damaging the rubber ring member 2 during actual use of the assembled ring. The strip 3, when in assembly as shown in Fig. 1, will assume the form of a split ring which, due to its light thin form, will not damage the rubber ring member 2. The strip 3 will be so positioned in assembly that it will extend across the space between the joint ends 1a of the metal ring 1 and will thus prevent the same from damaging the rubber ring member 2.

As above noted, the piston P will have the same depth of groove as usual; that is, the groove will be of less depth than the over-all radial extent of the combined three-part ring assembly prior to its installation, as indicated in Fig. 3 of the present drawing. Then, when in operative assembly, the ring member 1 and the annular guard strip 3 will be compressed radially and circumferentially towards closed position, as indicated in Fig. 1 of the drawing, and the rubber ring 2 will be compressed both radially and laterally or circumferentially so as to assume effective sealing engagement with the side walls of the piston groove and also to increase the factor of radial resilience of the entire ring assembly and hence the dependability of its sealing engagement with the cylinder wall as well as the walls of the piston groove.

It is to be noted that the outer ring member 1 has a plain inner surface which will accommodate the plain flat thin strip 3 for effective engagement thereagainst in the manner explained. Also, the rubber ring member 2 of substantially round cross section, may have sealing engagement with only the side and rear walls of the piston groove and the inner surface of the strip 3, when in compressed condition in assembly, without being compressed into the corner portions, as indicated in Fig. 2 of the present drawing. Thus there may be precluded any danger of the rubber ring 2 being pinched and damaged about the edges of the metal ring member 3, while at the same time there may be ensured most dependable sealing effect by the rubber ring.

Whereas heretofore it has been found that a rubber ring would be damaged at the joint of the outer metal ring member 1, as above noted, even to the extent of extrusion of the rubber outwardly therethrough, such damage is entirely avoided in our present combination and neither is there any danger of any such damage to the rubber ring member 2 between the spaced ends of the flat thin strip 3. Another practical advantage resides in the fact that our present combination permits the use of the conventional form of piston ring 1 with its plan inner surface which most conveniently and effectively accommodates our intermediate guard strip 3. This means a saving in the cost of production of our present assembly since it does not require any special form of outer ring member.

Other advantages will suggest themselves to those who are familiar with the art to which the present invention relates. For instance, our effective and dependable form of seal is capable of long life and may be embodied in various installations.

What we claim is:

1. A sealing means comprising a resilient split plain flat metallic ring member with a joint for closing the ends thereof and having a plain inner surface, a closed resilient compressible rubber-like ring member of substantially round cross section arranged within said metallic ring member and adapted to be compressed radially and circumferentially for effecting sealing engagement said rubber-like ring member being adapted to exert force upon said split metallic ring member only radially upon said plain surface thereof, and a thin plain metallic spring strip arranged between said rubber-like ring member and the joint of said split metallic ring member and assuming ring form so as extend across said joint and protect said rubber-like ring member in the region thereof only the opposite plain flat surfaces of said spring strip having engagement with said split ring member and said rubber-like ring member, and said rubber-like ring member when under compression in assembly being adapted to have sealing engagement with only the middle portions of the rear surface of said plain metallic spring strip and of the side and rear walls of the groove in which installed so as to preserve clearance between said rubber-like ring member and the corners between the edges of said plain metallic spring strip and the side walls of the grooves in which the assembly is installed.

2. A sealing means comprising a resilient split plain flat metallic ring member with a joint for closing the ends thereof and having plain inner and outer surfaces, a closed resilient compressible rubber-like ring member arranged within said metallic ring member and adapted to be compressed radially and circumferentially for effecting sealing engagement, said rubber-like ring member being adapted to exert force upon said split metallic ring member only radially upon the said plain surface thereof, and a thin plain flat metallic spring strip arranged between said rubber-like ring member and the joint of said split metallic ring member and assuming ring form so as to extend across said joint and protect said rubber-like ring member in the region of the same, only the opposite flat surfaces of said spring strip having engagement with said split ring member and said rubber-like ring member.

ROLLAND D. SMITH.
GEORGE T. TURNER.

REFERENCES CITED

The following references are of record in the file of this patent:

UNITED STATES PATENTS

| Number | Name | Date |
|---|---|---|
| 788,769 | Harsen | May 2, 1905 |
| 1,239,726 | Sauer et al. | Sept. 11, 1917 |
| 1,304,360 | Norwood | May 20, 1919 |
| 1,930,654 | Muchnic | Oct. 17, 1933 |
| 2,456,529 | Naab | Dec. 14, 1948 |
| 2,459,562 | La Brie | Jan. 18, 1949 |
| 2,462,586 | Whittingham | Feb. 22, 1949 |